Dec. 23, 1969   F. CHRISTOF   3,485,507
ACCESSORY SEAT FOR TOY VEHICLE
Filed Dec. 22, 1967   2 Sheets-Sheet 2
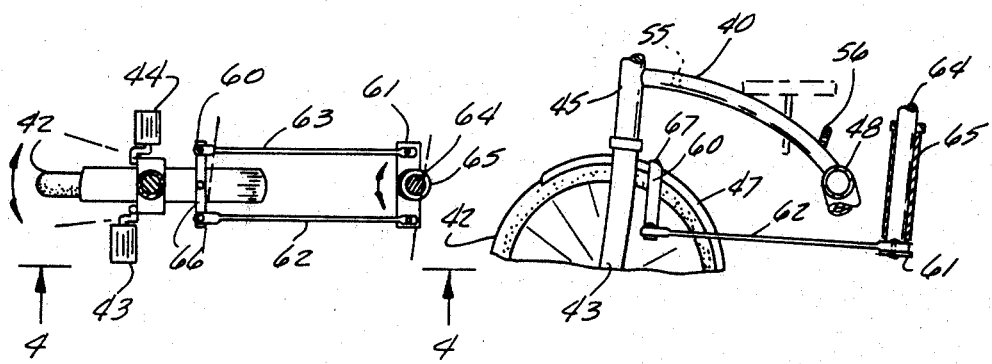
Fig_3   Fig_4
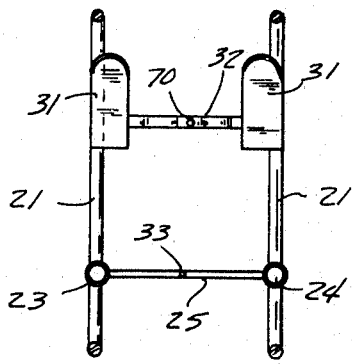
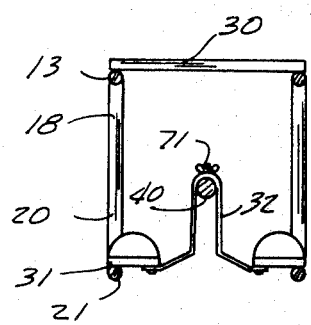
Fig_5   Fig_7
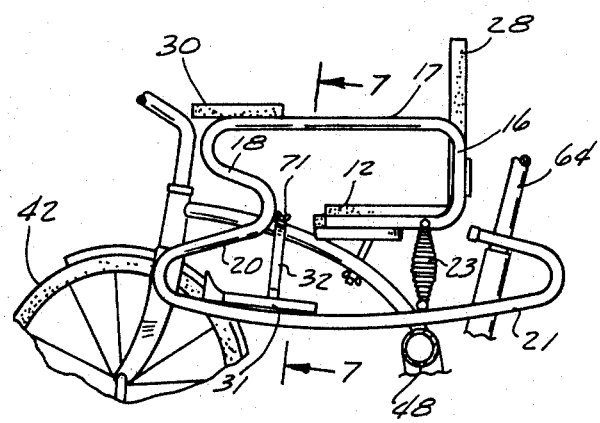
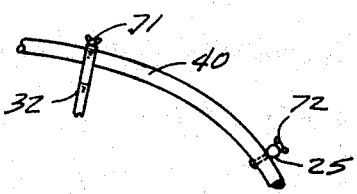
Fig_8
Fig_6
INVENTOR.
FRANK CHRISTOF
BY Roger A. Marrs United States Patent Office 3,485,507
Patented Dec. 23, 1969

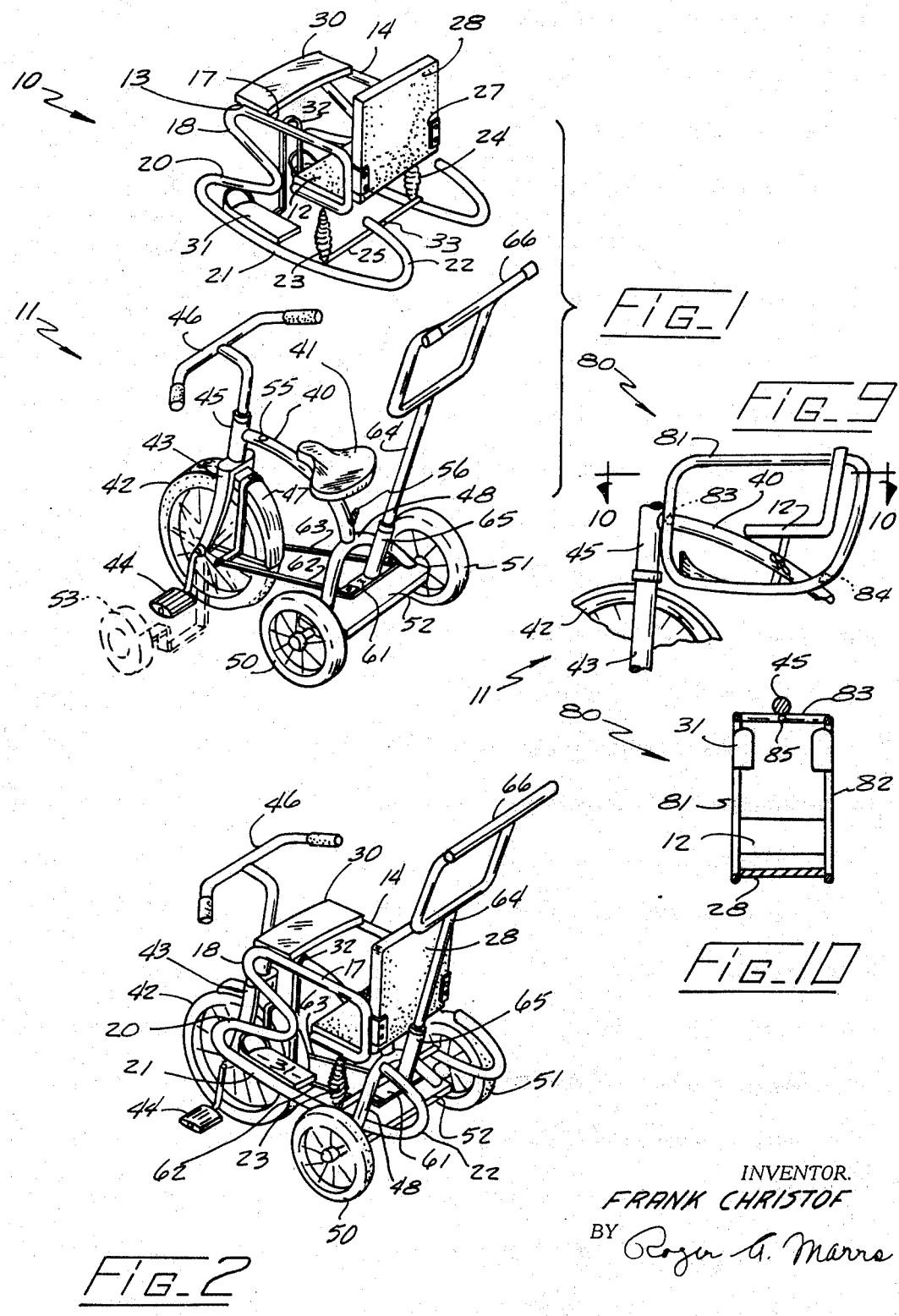

3,485,507
ACCESSORY SEAT FOR TOY VEHICLE
Frank Christof, 340 21st Place,
Santa Monica, Calif. 90402
Filed Dec. 22, 1967, Ser. No. 692,911
Int. Cl. B62b 7/12; B62g 7/04
U.S. Cl. 280—202                         12 Claims

ABSTRACT OF THE DISCLOSURE

The combined tricycle vehicle and accessory seat disclosed herein provides a seat member for an infant or small child which is supported between lateral siderails having downwardly extending arcuate sections adapted to serve as rocker supports when the accessory seat is not attached to the tricycle vehicle. Mounting means are provided for detachably coupling the accessory seat to the main support bar carried on the frame of the tricycle vehicle. The vehicle includes a steering mechanism adapted to be operated by a person in an upright position for controlling the direction of vehicle travel and for pushing the vehicle and accessory seat assemblage.

BACKGROUND OF THE INVENTION

Field of the Invention

This invention relates to improvements in convertible toy vehicles and accessory equipment. More particularly, the invention provides an improved combined tricycle vehicle and accessory seat detachably mounted thereon which is adapted to be steered and pushed along a supporting surface, and which may be readily and quickly converted into a stroller and into separate mobile or immobile child seats in the form of a tricycle vehicle or a rocking chair.

Description of the prior art

In the toy equipment industry, it has been the customary practice to design, manufacture and sell separate and independently constructed children's toys and accessories for the purposes of a tricycle vehicle, stroller, rocking chair, baby walker, etc. Each toy or accessory is sold as an independent unit and consequently, it is normally necessary to purchase a multiplicity and plurality of separate such toys or accessories in order to accommodate desired services and amusements required in the rearing of an infant or child. Each such accessory is expensive so that the accumulation of several accessories is quite costly, and the number of accessories requires substantial storage space when not in use.

As one example, a conventional tricycle vehicle may be employed to support a child on the seat mounted on the main crossbar of the frame wherein the child may employ his legs to power the front wheels thereof by means of the pedals attached thereto while steering the vehicle by means of handlebars. However, conventional tricycle vehicles are not adapted to be used by an infant whose legs are neither strong enough nor of sufficient length to reach the pedals to power the front wheels. Furthermore, the conventional vehicle cannot be employed as a stroller or carriage which is pushed by a person in an upright position in much the same manner as conventional strollers.

Another example of a child's accessory is a conventional rocking chair which either includes a rocker base or springs adapted to permit vertical movement of the chair occupant. Although substantial pleasure and enjoyment is provided to the occupant, conventional rocker seats are not adapted to be employed with other children's toys or accessories so that full utilization of the device is not achieved. The conventional rocking chair may be considered immobile since it does not travel along a supporting surface and therefore does not require a steering mechanism or structure which would permit the chair to be manually powered.

Therefore, a need has existed to provide all of the above applications with compatible accessory equipment which is readily and quickly converted into one of a variety of children's toys or accessories for amusement uses which are normally attributable to the use of separate and independent accessories.

SUMMARY OF THE INVENTION

Accordingly, the problems and difficulties encountered with conventional convertible and foldable children's apparatus are obviated by the present invention which provides a tricycle vehicle having a crossbar extending between a front wheel assembly and a rear assembly on which a seat is secured so as to support a child. The front wheel assembly includes a pedal arrangement whereby the vehicle may be powered by the child's legs and steering is achieved by a handlebar under the control of the child's arms and hands. An alternate or supplemental steering mechanism is provided in the form of parallel crossbars pivotally carried on the front and wheel assemblies having their opposite ends coupled together via pivot connections by a pair of rigid rods. A steering column is secured to the central section of the rear crossbar so that pivotal movement of the crossbar is translated via the rods into pivotal movement of the front crossbar and hence, the front wheel assembly for determining the direction of vehicle travel. The steering column is supported in a substantially upright position so that a person may push the vehicle as well as steer the vehicle from a walking position.

An accessory to the tricycle vehicle is provided in the form of an auxiliary seat having a seat member mounted between siderails, each of which include a downwardly depending arcuate portion. The arcuate portions serve as rockers for the support of the seat when it is not mounted on the tricycle vehicle. The seat accessory may include a tray portion and a back portion and may include resilient means for supporting the seat member so that the occupant may bounce in a vertical direction for amusement purposes. The auxiliary seat includes mounting means for detachably mounting the auxiliary seat onto the crossbar of the tricycle vehicle. When the auxiliary seat is so combined with the vehicle, the combined apparatus may be employed as a stroller with the auxiliary steering mechanism employed to direct the path of travel therefor.

Therefore, it is among the primary objects of the present invention to provide a toy vehicle and accessory seat structure which is selectively adjustable to provide a variety of functions and purposes associated with the normal requirements and usage of an infant or small child where the use of the apparatus may be employed for particular requirements from the time of infancy through childhood.

Another object of the present invention is to provide a children's vehicle wherein portions are removable so as to readily convert the apparatus into a variety of singular or combined structures suitable for achieving many childhood uses wherein such convertible portions may be manually attached or detached by unskilled and untechnical persons.

Still another object of the present invention is to provide a novel convertible tricycle vehicle having a steering mechanism adapted to be operated by a non-occupant of the vehicle.

Yet another object of the present invention is to provide a novel convertible toy apparatus wherein an accessory seat may be readily mounted onto the frame of a stabilized tricycle vehicle so that infants may be supported thereon and which further includes a steering mechanism adapted to be operated by a person pushing the apparatus.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIGURE 1 is an exploded perspective view of the novel seat accessory in combination with a tricycle vehicle having a remote steering mechanism;

FIGURE 2 is a perspective view of the combined accessory seat and tricycle vehicle apparatus of the present invention illustrated in a stroller configuration;

FIGURE 3 is a sectional view of the tricycle vehicle illustrating the steering mechanism therefor as taken in the direction of arrows 3—3 of FIGURE 1;

FIGURE 4 is a fragmentary side elevational view, partly in section, of the steering mechanism shown in FIGURE 3 as taken in the direction of arrows 4—4 thereof;

FIGURE 5 is a sectional view of the accessory seat as taken in the direction of arrows 5—5 of FIGURE 1;

FIGURE 6 is a fragmentary side elevational view of the combined accessory seat and tricycle vehicle apparatus as shown in FIGURE 2;

FIGURE 7 is a vertical cross-sectional view of the combined accessory seat and tricycle vehicle as taken in the direction of arrows 7—7 of FIGURE 6;

FIGURE 8 is a fragmentary view of the mounting means for detachably supporting the accessory seat on the frame of the tricycle vehicle as shown in FIGURE 6;

FIGURE 9 is a side elevational view of another embodiment of an accessory seat adapted to be detachably mounted on the tricycle vehicle; and FIGURE 10 is a sectional view of the accessory seat of the other embodiment taken in the direction of the arrows 10—10 of FIGURE 9.

DESCRIPTION OF THE PREFERRED EMBODIMENTS

With reference to FIGURES 1 and 2, the novel combined accessory seat and tricycle vehicle apparatus of the present invention is shown in its configuration to serve as a stroller. The apparatus comprises, in general, an accessory seat indicated in the general direction of arrow 10 adapted to be detachably mounted on a tricycle vehicle indicated in the direction of arrow 11.

The accessory seat 10 includes a seat member 12 which is supported between siderails 13 and 14 that are preferably composed of tubular construction. Each rail is shaped, such as by bending, to include a base section 15 on which the respective opposite ends of seat member 12 are securely fastened and a vertical section 16 which projects upwardly from the seat member and then forwardly in a guardrail section 17. The forward end of each guardrail is bent rearwardly and then forwardly to form a V-shaped section composed of segments 18 and 20. The tubular siderails are further configured to provide an arcuate section 21 serving as a support for the accessory seat when the seat is detached from the vehicle 11. The arcuate sections 21 terminate in forwardly extending end sections 22. By this construction, it can be seen that the seat member 12 is resiliently supported inasmuch as the V-shaped segments 18 and 20 provide a spring action therefor since the base sections 15 may be said to be cantilevered from the spring segments 18 and 20 via the guardrails 17. The spring action is controlled by the addition of a pair of coiled springs 23 and 24 which are operably connected between the base sections 15 and the arcuate sections 21 of the respective siderails 13 and 14. For stability purposes, a rigid rod 25 is connected between the arcuate portions 21 of the siderails and the lower end of each spring 23 and 24 may be suitably connected thereto.

A pair of brackets 26 and 27 are carried on the respective vertical section 16 of each rail and are employed to support a seatback 28. Secured between the forward ends of sections 17 of each rail, there is provided a tray 30 which is intended to be disposed over the knees and a portion of the legs of the seat occupant. Located beneath the tray 30 and secured to the arcuate sections 21 of each rail, there is provided a footrest 31 adapted to support the feet of the seat occupant.

Mounting means are provided on the accessory seat for detachably securing the seat to the vehicle 11 which comprise a substantially U-shaped member 32 having its opposite ends secured respectively to the pair of footrests 31 and an aperture 33 formed midway between the opposite ends of the rod 25.

In its detached configuration, the accessory seat may be employed as a rocker for an infant or small child whereby forward and rearward rocking movement of the occupant's upper torso will cause the accessory seat to rock on the arcuate sections 21. Enjoyment of the accessory seat as a rocker is achieved by the resilient mounting of the seat member 12 so that additional body movements of the occupant can be achieved.

The tricycle vehicle 11 includes a main frame crossbar 40 having a seat 41 secured thereon substantially midway between its opposite ends which are securely fixed to a front wheel assembly and a rear wheel assembly, respectively. The front wheel assembly includes a wheel 42 which is suitably mounted between the parallel spaced apart legs of a yoke 43 by means of an axle whose opposite ends terminate in a pair of pedals 44. The upper part of yoke 43 is rotatably mounted in a steering sleeve 45 which serves to rotatably mount a handlebar arrangement 46. A fender 47 is suitably mounted on the yoke 43 so as to partially cover the tread of the wheel 42.

The rear wheel assembly includes a curved support bar 48 secured to the rear end of the crossbar 40 while the opposite ends of bar 48 serve to rotatably mount the opposite ends of an axle (not shown) on which a pair of rear wheels 50 and 51 are carried. A step plate 52 is mounted over the axle between the opposite ends of curved support bar 48.

If desired, the tricycle vehicle 11 may include a pair of training wheels such as is indicated in broken lines by the numeral 53. Each training wheel includes a bracket portion 54 adapted to be detachably secured to the terminating end of the yoke 43 and each bracket is provided with a configuration adapted to permit the pedals 44 to be moved without interference therewith. The training wheels 53 serve to support the vehicle by providing an outrigger arrangement so that the vehicle will not be easily tipped or overturned. This feature is important from a safety standpoint when an infant is the occupant of the accessory seat.

Means are provided on the vehicle for accepting the accessory seat 10 which include an aperture 55 formed in the frame bar 40 in close proximity to the steering sleeve 45 and a threaded stud 56 outwardly projecting from the frame bar 40 adjacent its securement with the support rod 48. Aperture 55 is placed so as to register with a mating aperture in the attachment member 32 of the accessory seat while stud 56 is adapted to register with the aperture 33 in the stabilizing rod 25 thereof.

The tricycle vehicle also includes an additional or supplemental steering mechanism which comprises a front crossbar 60 suitably mounted on the fender 47 and a rear crossbar 61 pivotally mounted on the step 52. Although the front crossbar 60 is fixedly secured to the fender 47, it is to be understood that crossbar 60 will pivot inasmuch as the fender will pivot as the yoke 43 is rotated within the steering sleeve 45. The opposite ends of the forward crossbar 60 and the rear crossbar 61 are joined via pivotal connection by a pair of substantially parallel extending rigid rods 62 and 63. Therefore, as the rear crossbar 61 is pivoted, the forward crossbar will be pivoted accordingly and the pivoting of the forward crossbar 60 will cause the entire front wheel assembly to follow the pivotal action. The rear crossbar 61 is pivoted by means of a steering column 64 which is rotatably mounted in a sleeve 65 at one end in connection with the crossbar 61. The opposite end of the steering column 64 is provided with a handle arrangement 66 that may be readily grasped by the hands of a person in an upstanding and walking position. To this end, the steering column 64 is arranged at a slight angle in a vertical orientation.

Referring now to FIGURES 3 and 4, it can be seen that the supplemental steering mechanism couples the steering column 64 to the front wheel assembly by means of the pair of crossbars 60 and 61 and the rods 62 and 63. By rotating the column 64 either clockwise or counterclockwise, the front wheel is forcibly urged in either a clockwise or counterclockwise direction so as to controllably select the path of travel for the vehicle. The cross-member 60 includes a curved portion 66 for coupling the bar to fender 47 such as by any suitable means, for example, fastener 67. The bar 60 includes downwardly depending extensions from each side of the curved portion 66 extending downwardly on opposite sides of the wheel 42 to terminate in outwardly extending portions which are pivotally connected to the ends of rods 62 and 63, respectively.

Referring now to FIGURES 5–7, inclusive, it can be seen that the stabilizing rod 25 and mounting member 32 are parallel and that the siderails terminating in arcuate sections are additionally parallel and at right angles to the mounting member 32. Furthermore, attachment of the mounting member 32 to the frame bar 40 is achieved by registering aperture 70 with the aperture 55 on the frame bar so that a suitable fastener 71 may be passed therethrough and tightened down to effect securement.

With regard to FIGURE 8, it can be seen that the stud 56 projects through the aperture 33 on rod 25 so as to receive a nut fastener 72 which, when run down on the shank of the stud, effects securement. By this construction, the accessory seat 10 is removably mounted on the tricycle vehicle 11. The spring action of the springs 23 and 24, in combination with the resilient construction of the tubular member forming the V segments 18 and 20, provide suitable resilient support for the seat 12 for the enjoyment and comfort of the occupant. When so combined, as shown in FIGURE 6, the occupant may employ the foot supports 31 as a footrest and the tray 30 may be employed for supporting the hands of the occupant or toys. The guardrails 17 extend above the plane of the seat member 12 by virtue of vertical sections 16 so as to partially enclose the upper torso and arms of the occupant within the internal seating area.

Referring now to FIGURES 9 and 10, another embodiment of a suitable accessory seat is illustrated in the general direction of arrow 80 which is detachably mounted onto the vehicle 11. The accessory seat 80 includes parallel siderails 81 and 82 which are preferably of tubular construction wherein each rail represents a continuous structure. A pair of parallel rods 83 and 84 couple the opposite siderails together and include apertures 85 for receiving suitable fasteners coupling the accessory seat to the frame rod 40 of the vehicle. The seat includes footrests 31, a seat member 12 and a seatback 28 which are identical to the embodiment previously described. The seat may be either carried between the siderails or, if desired, the seat may be mounted on the frame bar 40 as shown in FIGURE 9.

Therefore, it can be seen that the novel toy vehicle and accessory seat of the present invention provides the user with a tricycle, a stroller and a rocking chair which may be used individually or in combination. Such an arrangement greatly reduces the cost of such items since the items individually are combined to achieve different functions and purposes. The combination, when assembled, is particularly safe and provides enjoyment and amusement for the occupant whether the occupant be an infant or a small child.

While particular embodiments of the present invention have been shown and described, it will be obvious to those skilled in the art that changes and modifications may be made without departing from this invention in its broader aspects.

What is claimed is:
1. In combination with a tricycle vehicle having
 a frame bar upon which a seat is mounted, said frame bar extending between the front and rear wheel assemblies of said tricycle vehicle, an accessory seat comprising:
 a pair of siderails arranged in fixed spaced apart parallel relationship;
 a seat member disposed between said siderails having its opposite ends secured to each of said respective siderails; and
 mounting means extending between said siderails for detachably securing said accessory seat onto said frame bar whereby said seat member is in close proximity to said frame bar mounted seat.
2. The invention as defined in claim 1 including
 means operably connected between said seat member and said siderails for resiliently biasing said seat member.
3. The invention as defined in claim 2 wherein
 said mounting means includes a forward bracket fixedly connected between said sidewalls adapted to straddle said frame bar in supporting relationship therewith and a rigid rod secured between said siderails; and
 said frame rod mounted seat being substantially disposed between said forward bracket and said rod when said accessory seat is mounted on said tricycle vehicle.
4. The invention as defined in claim 3 wherein
 each of said siderails is formed from tubular construction and is shaped to provide a base section supporting one end of said seat member, a guardrail section parallel to said base section and being elevated over said seat member, a vertical section joining said base section to said guardrail section and an arcuate section adapted to serve as a rocker support when said accessory seat is used independently of said tricycle vehicle.
5. The invention as defined in claim 4 wherein
 said resilient biasing means includes each of said siderails being formed with substantially V-shape segments interconnecting said guardrail section with said arcuate section so as to cantilever said seat member secured on said base section over said arcuate section.
6. The invention as defined in claim 5 wherein
 said resilient biasing means further includes a pair of coil springs interconnected between said seat member and each of said siderail arcuate sections normally urging said seat member in the direction of said arcuate sections.
7. The invention as defined in claim 6 including
 a seat back secured between said vertical sections of said siderails;
 a pair of foot rests carried respectively by each of said arcuate sections; and
 a tray secured between said guardrail sections over said foot rests.
8. The invention as defined in claim 1 including
 a steering mechanism operably connected between said front and rear wheel assemblies; and including
 a substantially upstanding steering column rotatably mounted on said rear wheel assembly adapted to pivotally control said front wheel assembly via said steering mechanism in response to manual rotation of said steering column.

9. The invention as defined in claim 1 including
a steering mechanism adapted to be operated by a person standing or walking behind said tricycle vehicle;
said steering mechanism comprising a first crossbar secured to said front wheel assembly, a second crossbar secured to an upstanding rotatable column, and rigid linkage pivotally interconnecting said first and second crossbars together so that said front wheel assembly pivots in response to rotational movement of said column.

10. In combination with a tricycle vehicle having
a longitudinal frame bar upon which a seat is mounted and that extends between a rotatable front wheel assembly and a fixed rear wheel assembly, a steering mechanism controllably extending between said wheel assemblies comprising:
a first crossbar fixedly secured on said front wheel assembly;
a steering column rotatably carried on said rear wheel assembly and extending in a substantially vertical orientation therefrom and being provided with a handle on its uppermost terminating end adapted to be grasped by a person for pushing said tricycle vehicle and for rotating said steering column;
a second crossbar fixedly secured to said steering column; and
a pair of rigid rods arranged in parallel relationship separated by said frame bar pivotally interconnecting the opposite ends of said first and second crossbars together whereby rotational movement of said column is translated into rotational displacement of said front wheel assembly to establish the directional path of travel of said tricycle vehicle.

11. The invention as defined in claim 10 including
a pair of outrigger stabilizing wheels detachably connected to said front wheel assembly.

12. The invention as defined in claim 10 including
an accessory seat having siderails arranged in fixed spaced apart relationship;
a seat member secured between said siderails and adapted to be placed over said frame bar seat; and
mounting means cooperatively carried on said accessory seat and said frame bar for detachable securing said accessory seat onto said tricycle vehicle.

References Cited

UNITED STATES PATENTS

| | | | |
|---|---|---|---|
| 453,212 | 6/1891 | Sager | 297—243 X |
| 650,335 | 5/1900 | Muchow | 280—202 |
| 1,467,271 | 9/1923 | Gutekunst | 280—47.11 X |
| 1,965,929 | 7/1934 | O'Connor | 280—202 |
| 2,954,070 | 9/1960 | Moeller | 297—250 X |
| 3,318,615 | 5/1967 | Chreist | 280—289 |

FOREIGN PATENTS 569,045   1/1924   France.

KENNETH H. BETTS, Primary Examiner

U.S. Cl. X.R.

280—30, 47.11, 293